(12) United States Patent
Okamatsu

(10) Patent No.: US 10,245,795 B2
(45) Date of Patent: Apr. 2, 2019

(54) COAGULANT AND TIRE PUNCTURE REPAIR KIT

(71) Applicant: THE YOKOHAMA RUBBER CO., LTD., Minato-ku, Tokyo (JP)

(72) Inventor: Takahiro Okamatsu, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 26 days.

(21) Appl. No.: 15/479,533

(22) Filed: Apr. 5, 2017

(65) Prior Publication Data

US 2017/0203525 A1 Jul. 20, 2017

Related U.S. Application Data

(62) Division of application No. 14/908,449, filed as application No. PCT/JP2014/070351 on Aug. 1, 2014, now abandoned.

(30) Foreign Application Priority Data

Aug. 1, 2013 (JP) ................. 2013-160730

(51) Int. Cl.
| | | |
|---|---|---|
| *B29C 73/16* | (2006.01) | |
| *C08L 3/02* | (2006.01) | |
| *C08L 3/12* | (2006.01) | |
| *C08L 7/00* | (2006.01) | |
| *C08L 23/08* | (2006.01) | |
| *B29K 23/00* | (2006.01) | |

(52) U.S. Cl.
CPC .............. *B29C 73/163* (2013.01); *C08L 3/02* (2013.01); *C08L 3/12* (2013.01); *C08L 7/00* (2013.01); *C08L 23/0853* (2013.01); *B29K 2023/083* (2013.01); *C08L 2201/52* (2013.01); *C08L 2205/02* (2013.01); *C08L 2205/035* (2013.01)

(58) Field of Classification Search
CPC . B29C 73/163; C08L 3/02; C08L 7/00; C08L 23/0853

USPC ......................................................... 523/166
See application file for complete search history.

(56) References Cited

U.S. PATENT DOCUMENTS

| | | |
|---|---|---|
| 3,082,173 A | 3/1963 | Horvitz |
| 2003/0104204 A1 | 6/2003 | Bond et al. |
| 2009/0023837 A1 | 1/2009 | Okamatsu et al. |
| 2011/0224590 A1 | 9/2011 | Jensen |
| 2012/0225978 A1 | 9/2012 | Kruger et al. |
| 2013/0172465 A1 | 7/2013 | Okamatsu et al. |
| 2015/0152302 A1 | 6/2015 | Lam et al. |

FOREIGN PATENT DOCUMENTS

| | | | |
|---|---|---|---|
| CA | 2335039 A1 | | 12/2000 |
| EP | 2 191 957 A1 | | 6/2010 |
| GB | 5335 | * | 2/1914 |
| GB | 174568 | * | 12/1922 |
| JP | H10-215796 A | | 8/1998 |
| JP | H11-269444 A | | 10/1999 |
| JP | 2005-168723 A | | 6/2005 |
| JP | 2007-302767 A | | 11/2007 |
| JP | 2009-041006 A | | 2/2009 |
| JP | 2009-136757 A | | 6/2009 |
| JP | 2011-246610 A | | 12/2011 |
| WO | 2009/025188 A1 | | 2/2009 |

OTHER PUBLICATIONS

Watanabe et al., "Effect of Dietary Methyl Linoleate and Linolenate on Growth of Carp-I", Bulletin of the Japanese Society of Scientific Fisheries, 1975, 41(2), 257-262.
Biermann, C.J., (1996). Handbook of Pulping and Papermaking (2nd Edition)—8.4.7 Starch, Elsevier, pp. 190-208.

* cited by examiner

*Primary Examiner* — Edward J Cain
(74) *Attorney, Agent, or Firm* — Carrier Blackman & Associates, P.C.; Joseph P. Carrier; Anne G. Sabourin

(57) ABSTRACT

The present invention is a tire puncture repair kit including tire puncture repair liquid and a coagulant for a tire puncture repair liquid with excellent coagulability. The coagulant of the present invention coagulates a tire puncture repair liquid, and contains an α-starch and/or a dextrin having a weight average molecular weight of 3,000 to 50,000.

18 Claims, 1 Drawing Sheet

COAGULANT AND TIRE PUNCTURE REPAIR KIT

RELATED APPLICATIONS

This application is a divisional application of U.S. Ser. No. 14/908,449, filed on Jan. 28, 2016, which is a National Phase of International Application No. PCT/JP2014/070351 filed on Aug. 1, 2014; and which is based upon and claims the benefit of priority from the prior Japanese Patent Application No. JP 2013-160730, filed on Aug. 1, 2013. The entire contents of each of such prior art applications are incorporated herein by reference.

TECHNICAL FIELD

The present invention relates to a coagulant and a tire puncture repair kit.

BACKGROUND ART

Conventionally, a coagulant has been used to recover puncture repair liquid after a tire puncture has been repaired using a tire puncture repair liquid (a tire puncture sealing material).

For example, in Patent Document 1, the present inventors of the present invention suggests "an emulsion coagulant for coagulating a tire puncture sealing material containing emulsion particles, in which the emulsion coagulant contains a mineral that induces aggregation of the emulsion particles as a result of weakening a surface charge of the emulsion particles and/or as a result of hydrogen bonding with the emulsion particles, and a gelling agent" (claim 1).

In addition, in Patent Document 2, the present inventors suggests "a liquid coagulant that coagulates an emulsion containing natural rubber latex, in which the liquid coagulant has a pH of 2.0 to 4.0, and contains a urethane resin and/or an acrylic resin having a cationic functional group" (claim 1).

CITATION LIST

Patent Literature

Patent Literature 1: Japanese Unexamined Patent Application Publication No. 2009-041006A
Patent Literature 2: Japanese Unexamined Patent Application Publication No. 2011-246610A

SUMMARY OF INVENTION

Technical Problem

The technical goal of the present invention is to provide a coagulant for a tire puncture repair liquid with excellent coagulability in the same manner as Patent Documents 1 and 2, and a tire puncture repair kit that uses the tire puncture repair liquid.

Solution to Problem

Following extensive investigation into the above-mentioned problem, the present inventors achieved the present invention by discovering that a coagulant that contains α-starch and/or a dextrin having a specific weight average molecular weight exhibits excellent coagulability of a puncture repair liquid.

That is, the present inventors discovered that the problems described above can be solved by the following features.

(1) A coagulant that coagulates a tire puncture repair liquid, the coagulant comprising at least one selected from the group consisting of an α-starch and a dextrin having a weight average molecular weight of 3,000 to 50000.

(2) The coagulant according to (1), in which the coagulant comprises at least the α-starch, and an amylopectin content of the α-starch is 75 mass % or more.

(3) The coagulant according to (1) or (2), in which the α-starch and the dextrin are used in combination.

(4) The coagulant according to any one of (1) to (3), further comprising at least one deliquescent inorganic salt selected from the group consisting of sodium chloride, potassium chloride and magnesium chloride.

(5) The coagulant according to any one of (1) to (4), in which the tire puncture repair liquid comprises at least one selected from the group consisting of a natural rubber latex and a synthetic resin emulsion.

(6) The coagulant according to (5), in which the tire puncture repair liquid further comprises an anti-freezing agent.

(7) The coagulant according to any one of (1) to (6), in which a used amount with respect to the tire puncture repair liquid is 5 to 150 parts by mass per 100 parts by mass of the tire puncture repair liquid.

(8) A tire puncture repair kit comprising the coagulant according to any one of (1) to (7) and a tire puncture repair liquid.

Advantageous Effects of Invention

As will be described below, according to the present invention, it is possible to provide a coagulant for a tire puncture repair liquid with excellent coagulability, and a tire puncture repair kit that uses the coagulant.

DESCRIPTION OF EMBODIMENTS

Coagulant

Figure 1A:
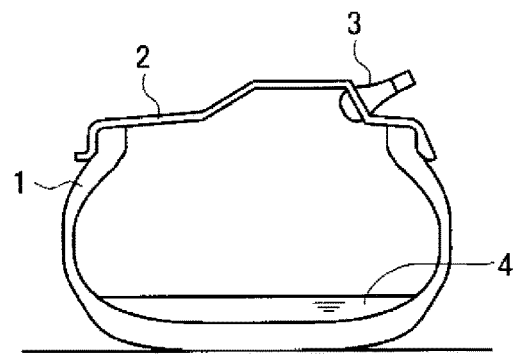
FIGS. 1A to 1C are schematic cross-sectional views illustrating an example of a method for recovering tire puncture repair liquid, which uses the coagulant of the present invention.

The coagulant of the present invention coagulates a tire puncture repair liquid, and contains an α-starch and/or a dextrin having a weight average molecular weight of 3,000 to 50,000.

In addition, it is preferable that the coagulant of the present invention comprise at least one deliquescent inorganic salt selected from the group consisting of sodium chloride, potassium chloride and magnesium chloride.

In the present invention, the coagulability with respect to a tire puncture repair liquid is made favorable by using the α-starch and/or the dextrin.

Although the reason is not clear in detail, it is assumed to be as follows.

That is, with regards to the α-starch, it is thought that the coagulability is made favorable as a result of the tire puncture repair liquid being taken in between saccharide chains in which the hydrogen bond have been broken. In addition, with regards to the dextrin, it is thought that the coagulability is made favorable as a result of the absorbability of the tire puncture repair liquid being raised due to the molecular weight of starch being decreased by oxygen or the like.

Hereinafter, the α-starch, the dextrin and deliquescent inorganic salts that may be contained as desired will be described in detail.

α-Starch

The term α-starch refers to a starch in a state in which the hydrogen bonds between saccharide chains in the starch have been broken down and the saccharide chains are free, and more specifically, refers to processed starch in which starch that has been gelatinized by adding water to and heating non-gelatinized starch (hereinafter, also referred to as "raw material starch"), and dried rapidly.

Examples of the above-mentioned raw material starch include non-gelatinized starch separated from potatoes, wheat, rice, corn, sweet potato, cassava, arrowroot, dogtooth violet, broad bean, mung beans, red beans, and the like.

Additionally, the α-starch may be a starch on which processing treatment such as esterification, etherification, or cross-linking have been further carried out on α-starch.

In the present invention, from a viewpoint of further improving the coagulability, the amylopectin content of the α-starch is preferably 75 mass % or more, and is more preferably 75 to 90 mass %.

In this instance, it is thought that the reason for the coagulability being further improved is that branched structures in the α-starch are increased as a result of the amylopectin content being within the above-mentioned ranges, and that it is possible for more tire puncture repair liquid to be taken in between the saccharide chains as a result.

In addition, in the present invention, the "amylopectin content" can be measured using a method in which sedimentation and separation of amylopectin is performed by reacting a concanavalin A, which specifically bonds with amylopectin, with a sample.

Dextrin

The term dextrin refers to a substance in which the molecular weight of a starch has been decreased, and in the present invention, a dextrin with a weight average molecular weight of 3,000 to 50,000 is used.

In this instance, as the starch in which the molecular weight has been decreased, it is possible to use the same substance as the raw material starch of the above-mentioned α-starch.

In addition, the weight average molecular weight of the dextrin is an average molecular weight (expressed in terms of polyethylene glycol) that is measured by the gel permeation chromatography (GPC).

Additionally, the above-mentioned dextrin may be a substance that is dry degraded (a torrefaction dextrin), and may be a substance that is wet degraded (an acid-treated starch, an oxidized starch, or an enzyme modified starch).

In the present invention, from a viewpoint of further improving the coagulability, the weight average molecular weight of the dextrin is preferably 20,000 to 50,000, and is more preferably 20,000 to 40,000.

The coagulant of the present invention is not particularly limited as long as it contains the α-starch and/or the dextrin, but from a viewpoint of further improving the coagulability, it is preferable that the α-starch and the dextrin be used in combination.

The reason for such an effect being exhibited is not clear, but it is thought that the dextrin takes up (absorb) the tire puncture repair liquid quickly, and thereafter, the α-starch coagulates the taken-in tire puncture repair liquid, that is, the functional disassociation of absorption and coagulation is achieved.

In addition, the coagulant of the present invention preferably contains 50 to 100 mass % of the α-starch and/or the dextrin with respect to the total mass of the coagulant, and more preferably contains 60 to 95 mass %.

Additionally, in a case of combined use of the α-starch and the dextrin, the above-mentioned mass % refers to the total mass %.

Deliquescent Inorganic Salt

From a viewpoint of it being possible to reduce an amount used with respect to a tire puncture repair liquid, it is preferable that the coagulant of the present invention include at least one deliquescent inorganic salt selected from the group consisting of sodium chloride, potassium chloride and magnesium chloride.

In this instance, the term "deliquescent" refers to a property of forming an aqueous solution by absorbing water (moisture) in air.

In the present invention, the content of the deliquescent inorganic salt is preferably 5 to 100 parts by mass per 100 parts by mass of the total of the α-starch and the dextrin (or the corresponding component in a case in which only either one is included), more preferably 5 to 50 parts by mass, and still more preferably 10 to 30 parts by mass.

Other Optional Components

For example, in addition to the above-mentioned components, the coagulant of the present invention can include additives such as a filler, an anti-aging agent, an antioxidant, a pigment (dye), a plasticizer, a thixotropic agent, a UV absorbent, a flame retardant, a surfactant, a dispersant, a dehydrating agent, or an antistatic agent as desired according to necessity.

Production Method

The production (preparation) method of the coagulant of the present invention is not particularly limited, and for example, it is possible to produce the coagulant by uniformly blending the α-starch and/or the dextrin, and the deliquescent inorganic salt and additives, which are optional components.

Tire Puncture Repair Liquid

A tire puncture repair liquid that is coagulated by the coagulant of the present invention is not particularly limited.

Examples of the tire puncture repair liquid include a repair liquid that contains a natural rubber latex and/or a synthetic resin emulsion, a repair liquid that contains an anti-freezing agent in addition to these, or the like.

Additionally, in a synthetic resin emulsion, the phase of the synthetic resin, which is a dispersoid, may be a liquid phase or may be a solid phase.

That is, in general, a system in which a liquid phase dispersoid is dispersed in a liquid phase dispersion medium is referred to as an "emulsion", and a system in which a solid phase dispersoid is dispersed in a liquid phase dispersion medium is referred to as a "suspension", but in the present invention, the term "emulsion" includes the definition of a "suspension".

Natural Rubber Latex

The natural rubber latex is not particularly limited, and a conventionally-known natural rubber latex can be used.

More specifically, examples of the natural rubber latex include a natural rubber latex that is extracted by tapping of *Hevea brasiliensis*, a so-called "deproteinized natural rubber latex" in which proteins have been removed from a natural rubber latex, and the like.

Synthetic Resin Emulsion

The synthetic resin emulsion is not particularly limited, and it is possible to use a conventionally-known synthetic resin emulsion.

More specifically, examples of the synthetic resin emulsion include a urethane emulsion, an acrylic emulsion, a polyolefin emulsion, an ethylene vinyl acetate copolymer emulsion, a polyvinyl acetate emulsion, an ethylene-vinyl acetate-vinyl versatate copolymer emulsion, a polyvinyl chloride emulsion, and the like, and a single type thereof may be used independently, or two or more types may be used in combination.

Antifreezing Agent

The antifreezing agent is not particularly limited, and it is possible to use a conventionally-known antifreezing agent.

More specifically, examples of the antifreezing agent include ethylene glycol, propylene glycol, diethylene glycol, glycerin, methanol, ethanol, isopropyl alcohol and the like, and a single type thereof may be used independently, or two or more types may be used in combination.

Additives

In addition to each of the above-mentioned components, the tire puncture repair liquid that is coagulated by the coagulant of the present invention can include various additives such as a filler, an anti-aging agent, an antioxidant, a pigment (dye), a plasticizer, a thixotropic agent, a UV absorbent, a flame retardant, a surfactant (including a leveling agent), a dispersant, a dehydrating agent, or an antistatic agent as desired according to necessity.

In the present invention, a used amount of the coagulant with respect to such a tire puncture repair liquid is preferably 5 to 150 parts by mass per 100 parts by mass of the tire puncture repair liquid, more preferably 5 to 100 parts by mass, and still more preferably 10 to 50 parts by mass.

Examples of the form (for example, the usage form or marketing form) of the coagulant of the present invention include individual use of the coagulant, and a set including the coagulant and a tire puncture repair liquid (a tire puncture repair kit).

Recovery Method

A method for recovering puncture repair liquid that uses the coagulant of the present invention (hereinafter, also referred to as a "use method of the coagulant of the present invention") will be described below using FIGS. 1A to 1C. Additionally, the use method of the coagulant of the present invention is not particularly limited to the aspect that is illustrated in FIGS. 1A to 1C.

Figure 1B:
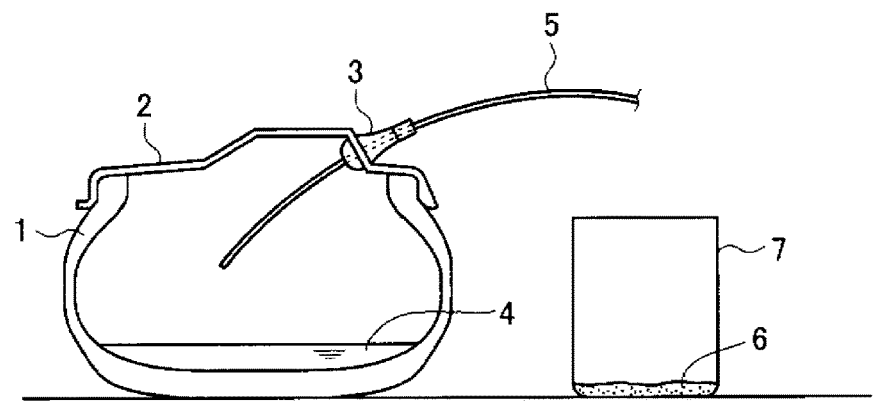
Figure 1C:
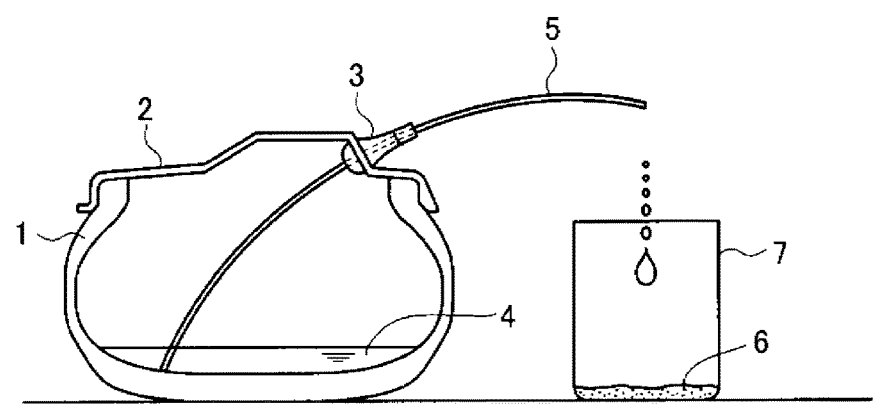

FIGS. 1A to 1C are schematic cross-sectional views illustrating an example of a method for recovering tire puncture repair liquid, which uses the coagulant of the present invention.

Firstly, as illustrated in FIG. 1A, a valve core (not illustrated in the drawing) is detached from a tire valve 3 of a wheel 2 in which a tire puncture repair liquid 4 is injected inside a pneumatic tire 1.

Next, as illustrated in FIG. 1B, a tube 5 is inserted inside the pneumatic tire 1 via the tire valve 3.

Subsequently, as illustrated in FIG. 1C, when the tip end of the tube 5, which is inserted, reaches the liquid surface of the tire puncture repair liquid 4, the tire puncture repair liquid 4 flows backward from inside the pressurized pneumatic tire 1 through the tube 5, and it is possible to recover the tire puncture repair liquid in a recovery pouch 7 into which the coagulant 6 is inserted in advance.

Tire Puncture Repair Kit

The tire puncture repair kit of the present invention includes the coagulant of the present invention and a tire puncture repair liquid.

In this instance, the tire puncture repair liquid in the tire puncture repair kit of the present invention is the same as the above-mentioned tire puncture repair liquid that is described as the target for coagulation by the coagulant of the present invention.

In addition, the used amount (a solid content) of the coagulant of the present invention when sealing a puncture hole using the tire puncture repair kit of the present invention is the same as the above-mentioned used amount of the coagulant of the present invention with respect to the tire puncture repair liquid, and is preferably 5 to 150 parts by mass per 100 parts by mass of the tire puncture repair liquid, more preferably 10 to 100 parts by mass, and still more preferably 10 to 50 parts by mass.

EXAMPLES

The present invention will now be described in greater detail using the following working examples, but is in no way limited to these examples.

Preparation of Tire Puncture Repair Liquid

Tire puncture repair liquids A and B were prepared by mixing the components of the tire puncture repair liquids A and B, which are shown in Table 1 below, at the quantities (unit: parts by mass) shown in the table using an agitator.

TABLE 1

|  | Repair liquid A | Repair liquid B |
| --- | --- | --- |
| Emulsion 1 | 30 | 60 |
| Emulsion 2 | 30 | 0 |
| Antifreezing agent | 40 | 40 |
| Surfactant A | 0.9 | 2.5 |
| Surfactant B | 0.15 | 0.5 |
| Total Quantity | 101.05 | 103 |
| Solid content (%) | 32.6 | 34.5 |

The details of each of the components of the tire puncture repair liquids A and B shown in Table 1 are as follows.

Emulsion 1: natural rubber emulsion (HA Latex, solid content: 60 mass %, produced by Golden Hope Co., Ltd.)

Emulsion 2: ethylene vinyl acetate emulsion (solid content: 51 mass %, Sumika Flex S-408HQE, produced by Sumika Chemtex Co., Ltd.)

Antifreezing agent: polypropylene glycol (solid content: 100 mass %, produced by Wako Pure Chemical Industries Co., Ltd.)

Surfactant A: sodium dodecyl sulfate (produced by Wako Pure Chemical Industries Co., Ltd.)

Surfactant B: Polyoxyethylene alkyl ether (Emulgen 109, manufactured by Kao Corporation)

Production of Coagulant

Working Examples 1 to 34, 35 and 36, and Comparative Examples 1 to 5

Coagulants were prepared by mixing the starch A, the α-starches B to I and/or the dextrins J to R components, which are shown in Table 2 below, at the quantities (unit: parts by mass) shown in the table using an agitator.

Evaluation: Coagulability Performance

Coagulants prepared using Working Examples 1 to 34, 35 and 36, and Comparative Examples 1 to 5 were added with the parts by mass shown in Table 2 per 100 parts by mass of either the tire puncture repair liquids A or B prepared in the manner mentioned above, and stirred.

After stirring, the mixtures were kept at 20° C., and the time (coagulation time) until fluidity is lost without the liquid content oozing out from the mixture of the tire puncture repair liquid and the coagulant was measured.

As a result of this, mixtures for which the coagulation time was within 30 minutes were evaluated as "⊚" having particularly excellent coagulability, mixtures for which the coagulation time was within 60 minutes were evaluated as "o" having excellent coagulability, mixtures for which the coagulation time was longer than 60 minutes but within 12 hours were evaluated as "Δ" there not being a problem with practical use thereof, and mixtures for which the coagulation time was longer than 12 hours were evaluated as "x" having inferior coagulability.

TABLE 2

| Table 2-I | | Amylopectin content (Mass %) | Average Molecular Weight | Comparative Example 1 | Working Examples 1 | 2 | 3 | 4 | 5 | 6 | 7 | 8 | Comparative Examples 2 | 3 | Working Examples 9 | 10 | 11 |
|---|---|---|---|---|---|---|---|---|---|---|---|---|---|---|---|---|---|
| Starch α-starch | A | 60 | | 100 | | | | | | | | | | | | | |
| | B | 50 | | | 100 | | | | | | | | | | | | |
| | C | 60 | | | | 100 | | | | | | | | | | | |
| | D | 70 | | | | | 100 | | | | | | | | | | |
| | E | 72 | | | | | | 100 | | | | | | | | | |
| | F | 75 | | | | | | | 100 | | | | | | | | |
| | G | 78 | | | | | | | | 100 | | | | | | | |
| | H | 83 | | | | | | | | | 100 | | | | | | |
| | I | 100 | | | | | | | | | | 100 | | | | | |
| Dextrin | J | | 2000 | | | | | | | | | | | 100 | | | | |
| | K | | 2500 | | | | | | | | | | | | 100 | | | |
| | L | | 3000 | | | | | | | | | | | | | 100 | | |
| | M | | 5000 | | | | | | | | | | | | | | 100 | |
| | N | | 10000 | | | | | | | | | | | | | | | 100 |
| | O | | 30000 | | | | | | | | | | | | | | | |
| | P | | 40000 | | | | | | | | | | | | | | | |
| | Q | | 50000 | | | | | | | | | | | | | | | |
| | R | | 70000 | | | | | | | | | | | | | | | |
| Used amount per 100 parts by mass of puncture repair fluid A | | | | 100 | 100 | 100 | 100 | 100 | 100 | 100 | 100 | 100 | 100 | 100 | 100 | 100 | 100 |
| Coagulability Performance | | | | X | Δ | Δ | Δ | ○ | ⊚ | ⊚ | ⊚ | ⊚ | X | X | Δ | Δ | Δ |

| Table 2-I | | Amylopectin content (Mass %) | Working Examples 12 | 13 | 14 | Comparative Examples 4 | Working Examples 15 | 16 | 17 | 18 | 19 | 20 | 21 |
|---|---|---|---|---|---|---|---|---|---|---|---|---|---|
| Starch α-starch | A | 60 | | | | | | | | | | | |
| | B | 50 | | | | | | | | | | | |
| | C | 60 | | | | | | | | | | | |
| | D | 70 | | | | | | | | 50 | | | |
| | E | 72 | | | | | | | | | | | |
| | F | 75 | | | | | 20 | 25 | 30 | | | | |
| | G | 78 | | | | | | | | | 70 | | |
| | H | 83 | | | | | | | | | | 5 | |
| | I | 100 | | | | | | | | | | | |
| Dextrin | J | | | | | | | | | | | | |
| | K | | | | | | | | | | | | |
| | L | | | | | | | | | | | | 100 |
| | M | | | | | | | | | | | | |
| | N | | | | | | | | | | | | |
| | O | | 100 | | | | | | | 50 | 30 | 95 | |
| | P | | | 100 | | | 80 | 75 | 70 | | | | |
| | Q | | | | 100 | | | | | | | | |
| | R | | | | | 100 | | | | | | | |
| Used amount per 100 parts by mass of puncture repair fluid A | | | 100 | 100 | 100 | 100 | 100 | 100 | 100 | 100 | 100 | 100 | 100 |
| Coagulability Performance | | | ○ | ○ | ○ | X | ○ | ○ | ○ | ○ | ○ | ○ | ○ |

TABLE 3

| Table 2-2 | | Amylopectin content (Mass %) | Average Molecular Weight | Working Examples | | | | | | | | | | | | | Comparative Examples | Working Examples | |
|---|---|---|---|---|---|---|---|---|---|---|---|---|---|---|---|---|---|---|---|
| | | | | 22 | 23 | 24 | 25 | 26 | 27 | 28 | 29 | 30 | 31 | 32 | 33 | 34 | 5 | 35 | 36 |
| Starch | A | 60 | | | | | | | | | | | | | | | 100 | | |
| α-starch | B | 50 | | | | | | | | | | | | | | | | | |
| | C | 60 | | | | | | | 40 | | | | | | | | | | |
| | D | 70 | | | | | | | | | | | | | | | | | |
| | E | 72 | | | | | | | | | | | | | | | | | |
| | F | 75 | | 20 | 30 | | | | | | | | | | | | | | |
| | G | 78 | | | | 70 | | | | 50 | 50 | 50 | 50 | 50 | 70 | 100 | | 50 | 70 |
| | H | 83 | | | | | 45 | | | | | | | | | | | | |
| | I | 100 | | | | | | 65 | | | | | | | | | | | |
| Dextrin | J | | 2000 | | | | | | | | | | | | | | | | |
| | K | | 2500 | | | | | | | | | | | | | | | | |
| | L | | 3000 | | | | | | | | | | | | | | | | |
| | M | | 5000 | | | | | | | | | | | | | | | | |
| | N | | 10000 | | | | | | | | | | | | | | | | |
| | O | | 20000 | | | | | | 60 | | | | | | | | | | |
| | P | | 30000 | 80 | 70 | | | | | | | | | | | | | | |
| | Q | | 35000 | | | 30 | 55 | | | 50 | 50 | 50 | 50 | 50 | 30 | | | 50 | 30 |
| | R | | 40000 | | | | | 35 | | | | | | | | | | | |
| Deliquescent inorganic salt | Sodium chloride | | | 5 | | 10 | | 50 | 100 | | | | | | 10 | | 20 | | 10 |
| | Potassium chloride | | | | 5 | | | | | 20 | 20 | | | | | | | 20 | |
| | Magnesium chloride | | | | | | 30 | | | | | 20 | 20 | 20 | | | | | |
| Used amount per 100 parts by mass of puncture repair fluid A | | | | 10 | 10 | 10 | 10 | 10 | 10 | 25 | 35 | 50 | 75 | 100 | 20 | 50 | 30 | | |
| Used amount per 100 parts by mass of puncture repair fluid B | | | | | | | | | | | | | | | | | | 25 | 10 |
| Coagulability Performance | | | | ○ | ○ | ◎ | ○ | ○ | ○ | ◎ | ◎ | ◎ | ◎ | ◎ | ○ | ○ | X | ◎ | ◎ |

The details of the coagulants shown in Table 2 are as follows.

Starch A: Reagent (amylopectin content: 60 mass %, produced by Wako Pure Chemical Industries Co., Ltd.)

α-starch B: Reagent (amylopectin content: 50 mass %, produced by Wako Pure Chemical Industries Co., Ltd.)

α-starch C: Reagent (amylopectin content: 60 mass %, produced by Wako Pure Chemical Industries Co., Ltd.)

α-starch D: α-wheat starch (amylopectin content: 70 mass %, produced by Nippon Flour Mills Co., Ltd.)

α-starch E: white bean (amylopectin content: 72 mass %, produced by Nippon Flour Mills Co., Ltd.)

α-starch F: α-corn (amylopectin content: 75 mass %, produced by Sanwa Starch Co. Ltd.)

α-starch G: α-red bean (amylopectin content: 78 mass %, produced by Sanwa Starch Co. Ltd.)

α-starch H: α-tapioca (amylopectin content: 83 mass %, produced by Sanwa Starch Co. Ltd.)

α-starch I: α-glutinous rice (amylopectin content: 100 mass %, produced by Nippon Flour Mills Co., Ltd.)

Dextrin J: Reagent (weight average molecular weight: 2,000, produced by Wako Pure Chemical Industries Co., Ltd.)

Dextrin K: Reagent (weight average molecular weight: 2,500, produced by Wako Pure Chemical Industries Co., Ltd.)

Dextrin L: Reagent (weight average molecular weight: 3,000, produced by Wako Pure Chemical Industries Co., Ltd.)

Dextrin M: Reagent (weight average molecular weight: 5,000, produced by Wako Pure Chemical Industries Co., Ltd.)

Dextrin N: Reagent (weight average molecular weight: 10,000, produced by Wako Pure Chemical Industries Co., Ltd.)

Dextrin O: Reagent (weight average molecular weight: 30,000, produced by Wako Pure Chemical Industries Co., Ltd.)

Dextrin P: Reagent (weight average molecular weight: 40,000, produced by Wako Pure Chemical Industries Co., Ltd.)

Dextrin Q: Reagent (weight average molecular weight: 50,000, produced by Wako Pure Chemical Industries Co., Ltd.)

Dextrin R: Reagent (weight average molecular weight: 70,000, produced by Wako Pure Chemical Industries Co., Ltd.)

Deliquescent Inorganic Salt: Sodium chloride (produced by Wako Pure Chemical Industries Co., Ltd.)

Deliquescent Inorganic Salt: Potassium chloride (produced by Wako Pure Chemical Industries Co., Ltd.)

Deliquescent Inorganic Salt: Magnesium chloride (produced by Wako Pure Chemical Industries Co., Ltd.)

As is evident from the results shown in Table 2, it was found that the coagulability performances of Comparative Example 1, which used starch, and Comparative Example 5, in which sodium chloride was used in combination, were inferior.

In the same manner, the coagulability performances of both Comparative Examples 2 and 3, in which a dextrin with a small weight average molecular weight was used, and Comparative Example 4, in which a dextrin with a large weight average molecular weight was used, were inferior.

In contrast to this, it was found that the coagulability performances of all of Working Examples 1 to 36, in which an α-starch and/or a dextrin with a weight average molecular weight of 3,000 to 50,000 were used, were excellent.

In particular, it was found that the coagulability performances of Working Examples 5 to 8, in which α-starches with an amylopectin content of 75 mass % or more were used, were more favorable.

In addition, it was found that, as a result of the combined use of the α-starch and the dextrin, the combined use of the deliquescent inorganic salt and the like, there is a tendency for the coagulability performance to be favorable even if the used amount with respect to the tire puncture repair liquid is reduced (Working Examples 22 to 36).

REFERENCE SIGNS LIST

1 Pneumatic tire
2 Wheel
3 Tire valve
4 Tire puncture repair liquid
5 Tube
6 Coagulant
7 Recovery pouch

The invention claimed is:

1. A tire puncture repair kit comprising: a coagulant comprising an α-starch and a dextrin having a weight average molecular weight of 3,000 to 50,000; and a tire puncture repair liquid.

2. The tire puncture repair kit according to claim 1, wherein the α-starch has an amylopectin content of 75 mass % or more.

3. The tire puncture repair kit according to claim 1, the coagulant further comprising at least one deliquescent inorganic salt selected from the group consisting of sodium chloride, potassium chloride and magnesium chloride.

4. The tire puncture repair kit according to claim 1, wherein the tire puncture repair liquid comprises at least one selected from the group consisting of a natural rubber latex and a synthetic resin emulsion.

5. The tire puncture repair kit according to claim 4, wherein the tire puncture repair liquid further comprises an anti-freezing agent.

6. The tire puncture repair kit according to claim 3, wherein the tire puncture repair liquid comprises at least one selected from the group consisting of a natural rubber latex and a synthetic resin emulsion.

7. The tire puncture repair kit according to claim 6, wherein the tire puncture repair liquid further comprises an anti-freezing agent.

8. The tire puncture repair kit according to claim 1, wherein a used amount of coagulant with respect to the tire puncture repair liquid is 5 to 150 parts by mass per 100 parts by mass of the tire puncture repair liquid.

9. The tire puncture repair kit according to claim 2, wherein a used amount of coagulant with respect to the tire puncture repair liquid is 5 to 150 parts by mass per 100 parts by mass of the tire puncture repair liquid.

10. The tire puncture repair kit according to claim 3, wherein a used amount of coagulant with respect to the tire puncture repair liquid is 5 to 150 parts by mass per 100 parts by mass of the tire puncture repair liquid.

11. The tire puncture repair kit according to claim 4, wherein a used amount of coagulant with respect to the tire puncture repair liquid is 5 to 150 parts by mass per 100 parts by mass of the tire puncture repair liquid.

12. The tire puncture repair kit according to claim 5, wherein a used amount of coagulant with respect to the tire puncture repair liquid is 5 to 150 parts by mass per 100 parts by mass of the tire puncture repair liquid.

13. The tire puncture repair kit according to claim 2, the coagulant further comprising at least one deliquescent inorganic salt selected from the group consisting of sodium chloride, potassium chloride and magnesium chloride.

14. The tire puncture repair kit according to claim 2, wherein the tire puncture repair liquid comprises at least one selected from the group consisting of a natural rubber latex and a synthetic resin emulsion.

15. The tire puncture repair kit according to claim 14, wherein the tire puncture repair liquid further comprises an anti-freezing agent.

16. The tire puncture repair kit according to claim 13, wherein a used amount of coagulant with respect to the tire puncture repair liquid is 5 to 150 parts by mass per 100 parts by mass of the tire puncture repair liquid.

17. The tire puncture repair kit according to claim 14, wherein a used amount of coagulant with respect to the tire puncture repair liquid is 5 to 150 parts by mass per 100 parts by mass of the tire puncture repair liquid.

18. The tire puncture repair kit according to claim 15, wherein a used amount of coagulant with respect to the tire puncture repair liquid is 5 to 150 parts by mass per 100 parts by mass of the tire puncture repair liquid.

* * * * *